US009597924B2

(12) United States Patent
Bajuyo

(10) Patent No.: US 9,597,924 B2
(45) Date of Patent: Mar. 21, 2017

(54) CONTAINER RETAINING DEVICE

(71) Applicant: Antonio Bajuyo, South Bend, IN (US)

(72) Inventor: Antonio Bajuyo, South Bend, IN (US)

(*) Notice: Subject to any disclaimer, the term of this patent is extended or adjusted under 35 U.S.C. 154(b) by 0 days.

(21) Appl. No.: 14/930,180

(22) Filed: Nov. 2, 2015

(65) Prior Publication Data

US 2016/0052331 A1 Feb. 25, 2016

Related U.S. Application Data

(63) Continuation of application No. 14/213,330, filed on Mar. 14, 2014, now Pat. No. 9,211,760.

(51) Int. Cl.
*B65G 7/12* (2006.01)
*B44D 3/14* (2006.01)
*A45F 5/02* (2006.01)
*A45F 5/10* (2006.01)
*E06C 7/14* (2006.01)

(52) U.S. Cl.
CPC ............... *B44D 3/14* (2013.01); *A45F 5/021* (2013.01); *A45F 5/102* (2013.01); *B65G 7/12* (2013.01); *E06C 7/14* (2013.01); *Y10S 224/904* (2013.01)

(58) Field of Classification Search
CPC ... E06C 7/14; E06C 7/146; B44D 3/14; A45F 5/021; A45F 5/102; B65G 7/12
USPC ........ 294/27.1, 32, 15; 248/210, 211, 312.1, 248/692; 220/762–764
See application file for complete search history.

(56) References Cited

U.S. PATENT DOCUMENTS

| 2,444,986 | A | * | 7/1948 | Gebhardt | E06C 7/14 248/211 |
| 2,912,204 | A | * | 11/1959 | Raysinger | E06C 7/146 248/210 |
| 4,396,174 | A | * | 8/1983 | Continenza | E06C 7/146 248/211 |
| 5,584,520 | A | * | 12/1996 | Niemeier | E06C 7/14 220/759 |
| 5,806,709 | A | * | 9/1998 | Marshall, II | B44D 3/14 220/755 |
| 6,474,607 | B1 | * | 11/2002 | Wilson | E06C 7/143 182/129 |
| 6,658,701 | B1 | * | 12/2003 | DeHart | A45F 5/10 16/422 |
| 7,387,323 | B1 | * | 6/2008 | Minnette | B44D 3/14 220/756 |
| 7,604,270 | B1 | * | 10/2009 | McCarthy | B65D 25/2829 16/422 |
| 8,863,981 | B1 | * | 10/2014 | Fontaine | B65D 25/28 220/755 |
| 9,211,760 | B2 | * | 12/2015 | Bajuyo | A45F 5/021 |
| 2002/0125385 | A1 | * | 9/2002 | Tweed | B44D 3/14 248/213.2 |
| 2009/0250294 | A1 | * | 10/2009 | Byers | E06C 7/14 182/129 |

* cited by examiner

*Primary Examiner* — Dean Kramer
(74) *Attorney, Agent, or Firm* — R. Tracy Crump

(57) ABSTRACT

A bucket holder is provided with a handle portion for ergonomically carrying and holding a bucket during transportation and use. The body portion is comprised of a surface pressed up against the can, while a hook opposite from the surface holds the bail in tension, using gravity and distance between the surface and the hook to maintain tension. The holder has at least one surface that can be pressed up against the can, allowing more than one position for the handle to be located.

18 Claims, 8 Drawing Sheets

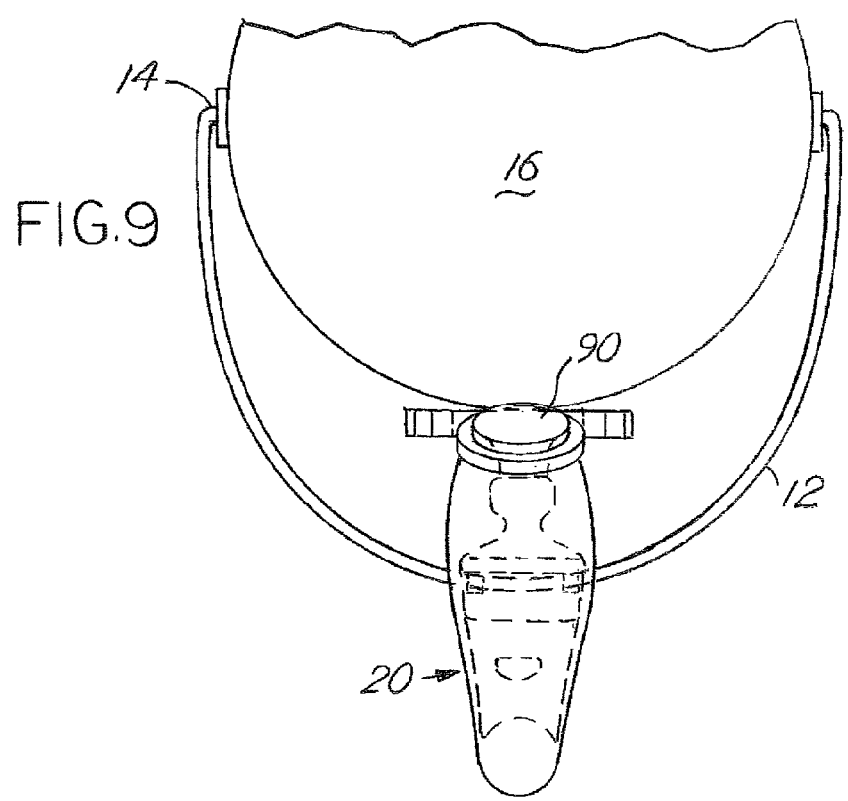
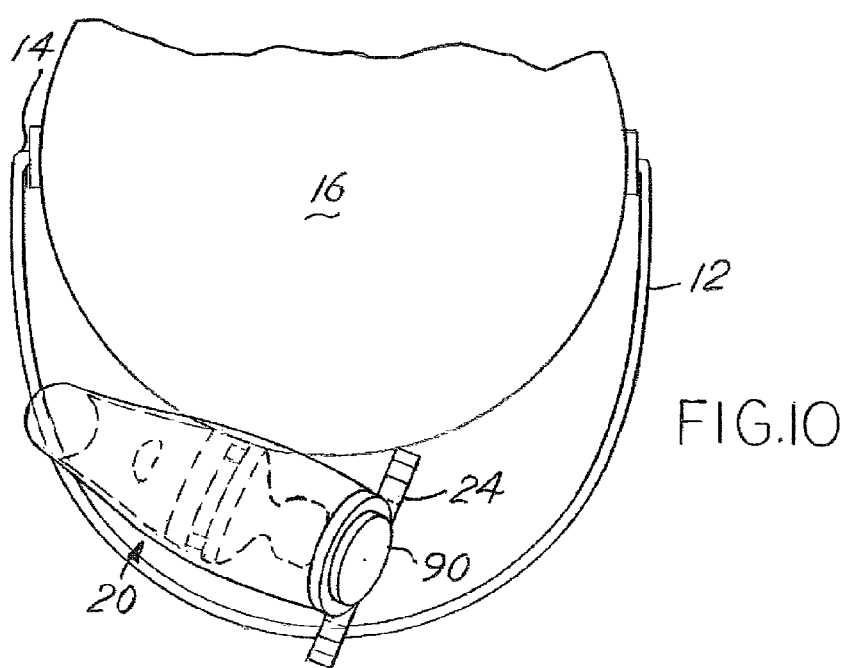

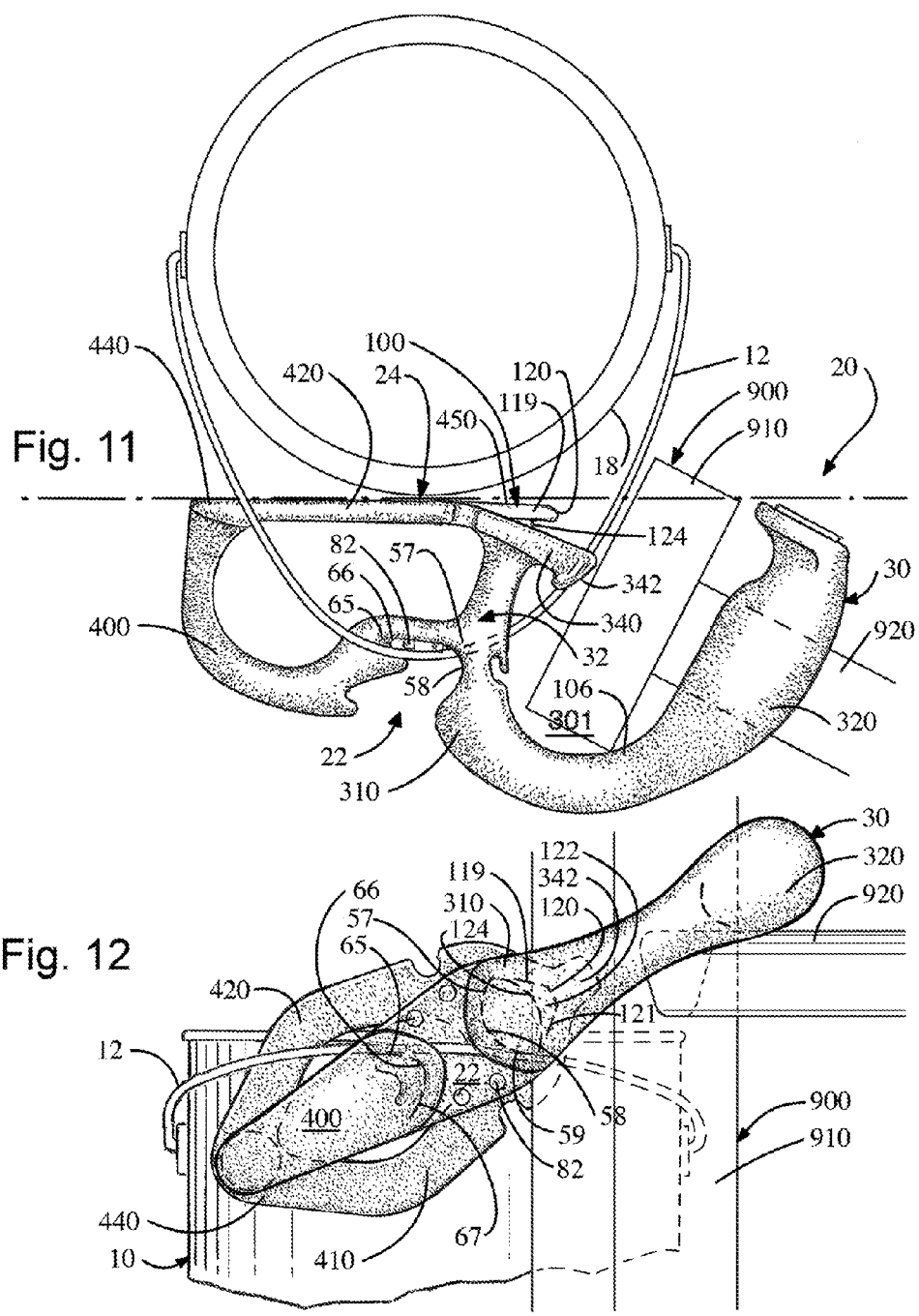

//CONTAINER RETAINING DEVICE

This is a continuation of pending U.S. patent application Ser. No. 14/213,330 filed on Mar. 14, 2014, which claims the benefit of U.S. Provisional Application No. 61/793,342 filed Mar. 15, 2013, the disclosure of which is hereby incorporated by reference.

BACKGROUND OF THE INVENTION

This present disclosure relates to devices to ergonomically hold buckets with handles, specifically a paint bucket with a wire bail. Painting frequently requires the user to twist and hold their bodies in many positions, while at the same time, hold a bucket full of paint along with a wet paint brush. Frequently, holding and carrying a bucket in various positions can cause fatigue, especially when the bail provided on the bucket is a relatively thin metal wire. Professional painters can suffer various levels of discomfort and repetitive stress injuries. There are devices currently on the market that are designed to improve the ergonomics of painting by connecting to the bail and the bucket in some fashion and providing some sort of handle, but these do not allow the flexibility of putting the handle in more than one position. Most standard paint container bails are only designed for use in tension. These bails, when put in compression, can unexpectedly disengage from one or both pivots. Not only can this create an unwanted mess, but bail failure can be very dangerous if a painter is working on a ladder. The holding device solves this problem by keeping the bail in sufficient tension to safely function when gripping upward, downward, or somewhere in between. In addition, devices currently available do not have the flexibility to be used with multiple styles of cans.

SUMMARY OF THE INVENTION

The present disclosure describes a device for securely holding a common paint bucket using the outside surface of the can and the bail, but can apply to other storage vessels and containers that have a handle and an outside surface. By keeping one surface of the holder against the outside surface of the bucket on one side of the holder and keeping the bucket bail in tension by the opposite side of the holder, it is possible to use a more easily gripped device to hold the bucket. The present invention allows the holding device to be installed in various positions that allow easier access to the bucket's opening. It is also possible to securely hold the device to a ladder in several positions, allowing the user flexibility not present in anything currently available. The holding device provides comfort and control when painters are using the lower thumb web gripping area. Unlike other container gripping devices for use with the thumb, the device's lower gripping area does not force the thumb to be crushed against the side of the can. The device is uniquely able to offer both upper and lower gripping options at the same time which is useful for switching hands. The user can also attach the device to multiple bucket styles. Other marketed handles cannot be installed on cans with exterior lips and even a slight motion of the handle toward the container opening will result in disengagement of these marketed handles from the adjacent installed position. The holding device solves this dangerous limitation by providing a surface that can snap under an exterior lip which creates a strong device attachment by holding the bail at a specific distance below the lip and adjacent to the can creating a strong tension in the bail and compressing the device strongly against the can. Additional features of the device allow buckets with an external lip to be held in various positions. The device can be rotated so the bucket can be held at different angles, thereby increasing the painter's comfort. By attaching a magnet to part of the device, it makes it easier to temporarily but securely store a paint brush or paint scraper over the bucket while the user is moving from one area to another, taking a break, or doing something that requires a free hand. The device can be used with alternate bucket designs, such as buckets with an external lip.

BRIEF DESCRIPTION OF THE DRAWINGS

A preferred embodiment of this invention has been chosen wherein:

FIG. 9 is a top view of the holding device as it is installed; and

FIG. 10 is a top view of the holding device as it is installed using an alternate can facing surface;

FIG. 11 is a partial top view of the holding device suspending a can from a ladder;

FIG. 12 is a partial side view of the holding device suspending a can from a ladder.

DESCRIPTION OF THE PREFERRED EMBODIMENT

Figure 1:
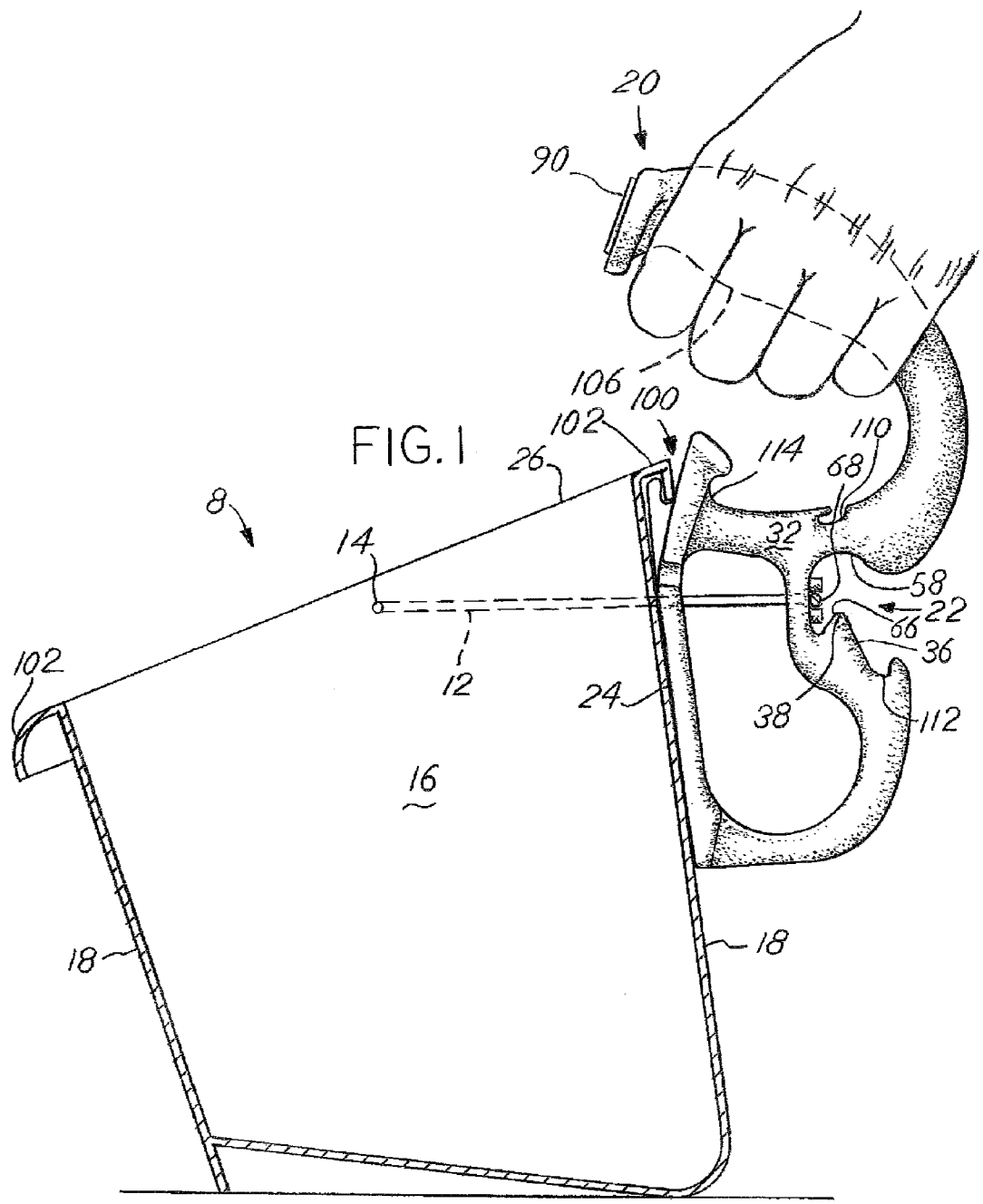
FIG. 1 is a side view of the holding device as it is installed on a lipped can.
Figure 2:
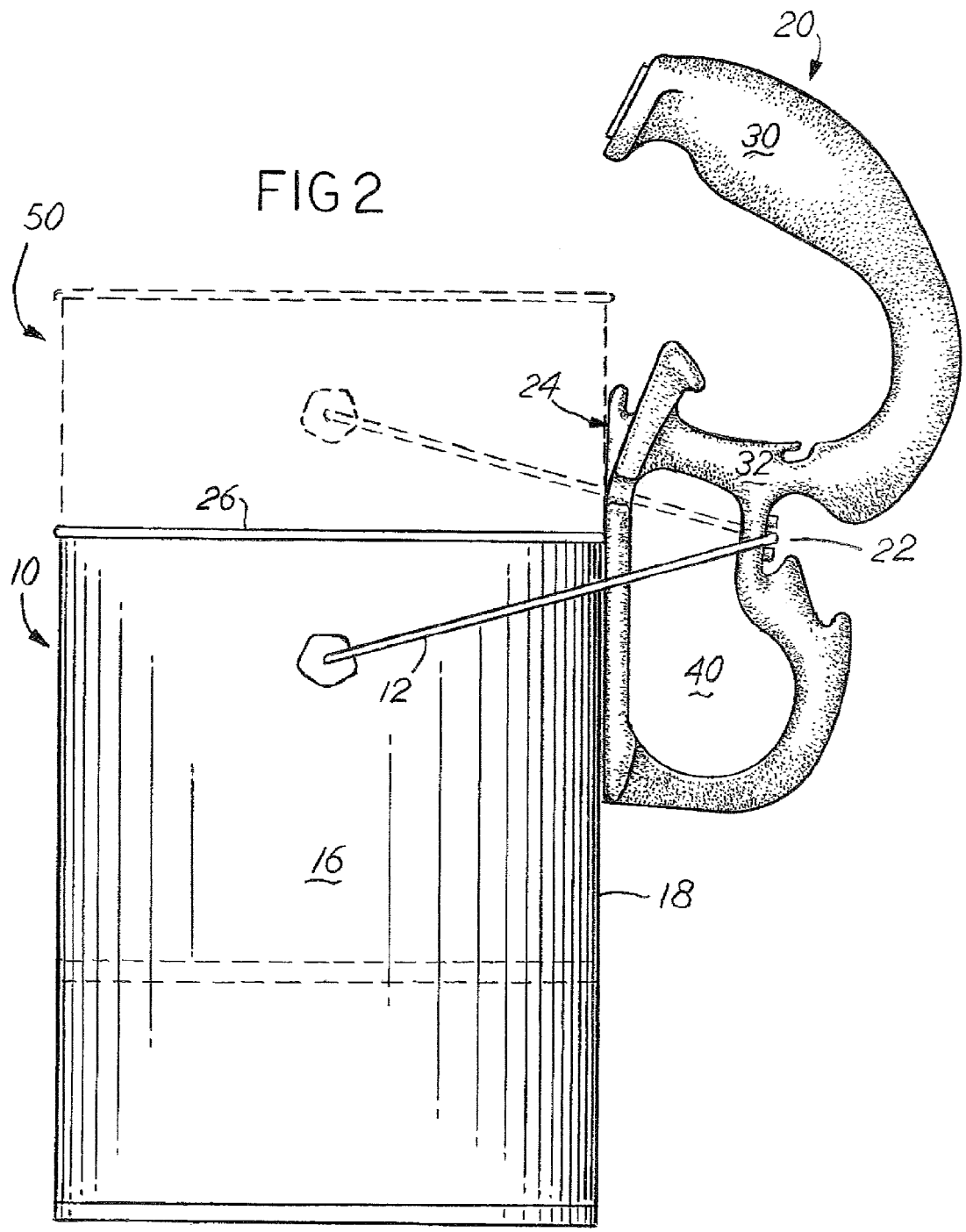
FIG. 2 is a side view of the holding device as it is installed on a non-lipped can.
Figure 3:
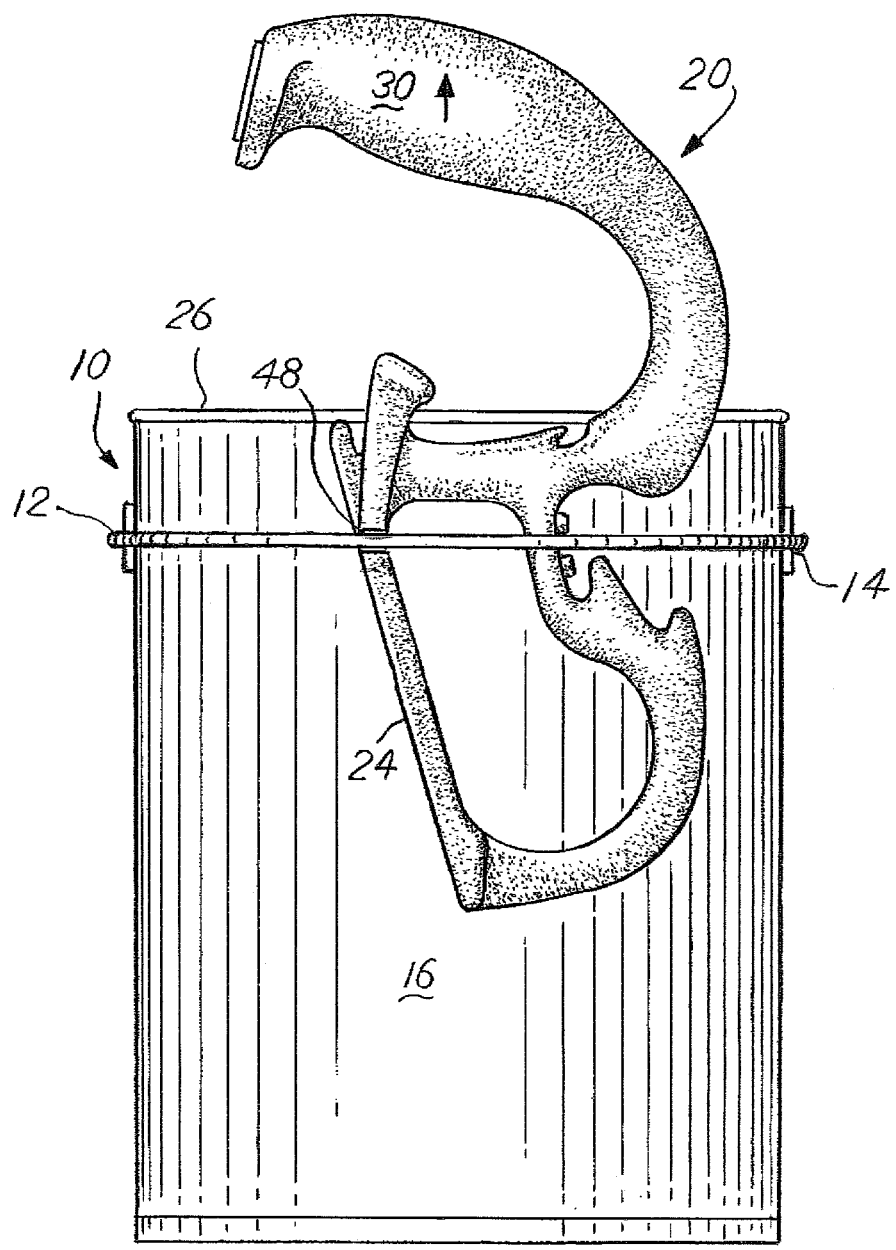
FIG. 3 is a side view of the holding device as it is installed using an alternate can facing surface.

A traditional paint can 10 as shown in FIGS. 2 and 3 has a bail 12 and a container 16 with an outside surface 18. The bail 12 pivots about the pivot points 14. The bail 12 is commonly made from metal wire bent to fit into the bail pivot points 14, which are typically near the top, as is commonly known in the art. The container 16 typically is round but other shapes are possible. The bail pivot points 14 are usually opposite on the can 10 such that the bail 12 pivots symmetrically and can be placed on either side of the container. A lipped can 8 as shown in FIG. 1 contains a bail 12, a container 16, and an outside surface 18, but has a lip 102 at or near the top surface 26.

The holding device 20 in FIG. 2 is made up of a handle portion 30 and a body 32. The handle portion 30 is designed such that it can comfortably fit into a human hand. In the preferred embodiment, many surfaces above and below the bail 12 are contoured to facilitate multiple holding positions. The handle portion 30, body 32, and other surfaces can be rounded or smoothed to allow comfortable holding by the user. Grippable surfaces may have varying degrees of softness, resilience, and tactility. Some portions may be gel-filled or elastomeric rubber while other areas may be smooth polypropylene or another relatively strong and durable plastic. The handle portion 30 can be hook shaped as is shown in FIG. 1 or a continuous loop, spheroidal, or "T"-shaped but is not limited to the forms as described. The device 20 can have additional features such as slots 110, 112, 114, as shown in FIG. 1 for carrying a paint can in different orientations or multiple paint cans at the same time. A catch surface 106 on the inside of the handle allows the device to be hung from a rung or side rail of a ladder. The catch surface 106 is defined by interior surfaces of the handle portion 30 such that the device can be tilted, the side rail fits inside, and compression between the surfaces of the side rail and the catch surface 106 keep the handle portion 30 securely engaged while handle portion 30 rests on a horizontal ladder rung.

Figure 4:
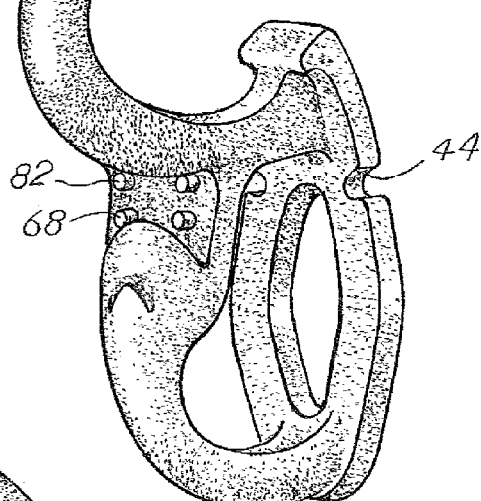
FIG. 4 is a perspective side view of the holding device.
Figure 5:
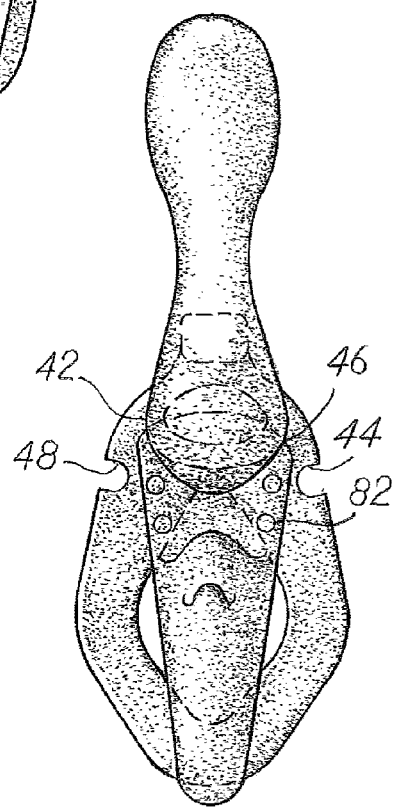
FIG. 5 is a front view of the holding device.
Figure 8:
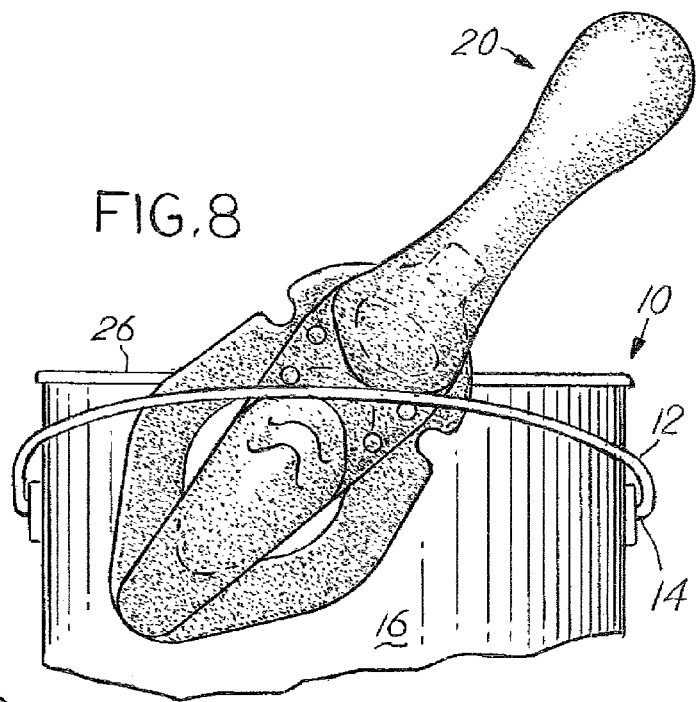
FIG. 8 is a front view of the holding device as it is installed in an alternate angle.

The body 32 has a first notch 22 and a first can facing surface 24 that are on opposite sides of the device 20. As shown in FIGS. 4 and 5, the first can facing surface 24 is wider in the middle than at its top and bottom, and generally configured in an oval shape, although alternative embodiments may take other shapes. The notch is designed to receive the bail 12. The opening of the first notch 22 can also have a lead-in 36 to guide the bail into the notch. The notch is defined as having an upper surface 58, a lower surface 66, and an internal cavity 68. The upper surface 58 and the lower surface 66 can be made up of surfaces of a specific width and thickness to limit the travel of the bail when the device 20 is installed on a can 10 as is shown in FIG. 8. As shown in FIG. 12, offset surfaces 65, 67, 57 and 59 cooperatively contact the bail during the pivoting for the ladder attachment. The upper surface 58 and lower surface 66 can have a restricted area 38. The restricted area 38 is located between a lead-in 36 and the cavity 68 of the first notch 22. The restricted area 38 may be slightly smaller than the cavity. The restricted area 38 could also be sized such that it causes an interference with the bail. When the restricted area 38 is sized for interference, the bail 12 passes from the lead-in 36 into the cavity 68, a small amount of pressure is required to push the bail 12 through the restricted area 38 into the cavity 68. The same would apply as the bail 12 is removed from the first notch 22. The shape of the first notch 22 and a restricted area 38 helps to retain the bail 12. The distance between the inside of the notch and the can facing surface are specific to the size and type of can. The holding device 20 can have a second can facing surface 42, FIG. 5 with a similarly designed opposing second notch 44. The distance between the second can facing surface 42 and the opposing second notch 44 is specific. It is also possible to have a third can facing surface 46 with an opposing third notch 48 and similar features to the first and second surfaces. The facing surfaces 24, 42, 46 do not need to be continuous. A surface can be a number of points to define a flat or curved contact area that will mate with the outside surface 18 of the container 16 when device 20 is installed. The surfaces can have holes for alternate holding and installation arrangements. In the preferred embodiment, the second and third can facing surfaces 42 and 46 have a hole 40, FIG. 6 between the two surfaces such that the user can hold the device 20 in alternate orientations.

Figure 6:
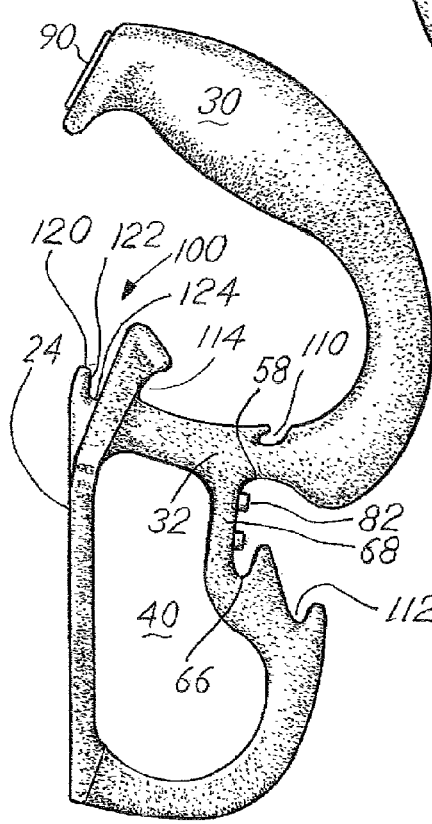
FIG. 6 is a side view of the holding device.

It is also possible to position the holding device 20 at various angles as shown in FIG. 8 to the central axis of the can 10 by defining the first notch 22 as shown in the preferred embodiment. The first notch 22 has a defined width that allows rotating the holding device 20 relative to the central axis of the can 16 within a certain range without disengaging the bail 12 from the first notch 22, second notch 44 and the third notch 48. The sides of the notch can be angled such that the angle of the can to first can facing surface 24, second can facing surface 42, and third can facing surface 46, relative to the axis of the can 16; is limited in either direction as is shown in FIG. 8. Through addition of protrusions 82 to the internal cavity of the first notch 22 as is shown in FIGS. 1-8, it is possible to capture the bail 12 at various angles as is shown in FIG. 8. By capturing a length of the bail between protrusions 82, it is possible to fix the angle of the can facing surface relative to the central axis of the can 16. With a can 8 that has an external lip 102 as is shown in FIG. 1 and FIG. 6, the stop 100 adjacent to the upper portion of the can facing surface 24 on the device 20 allows positioning of the holding device relative to the axis of the can.

Figure 7:
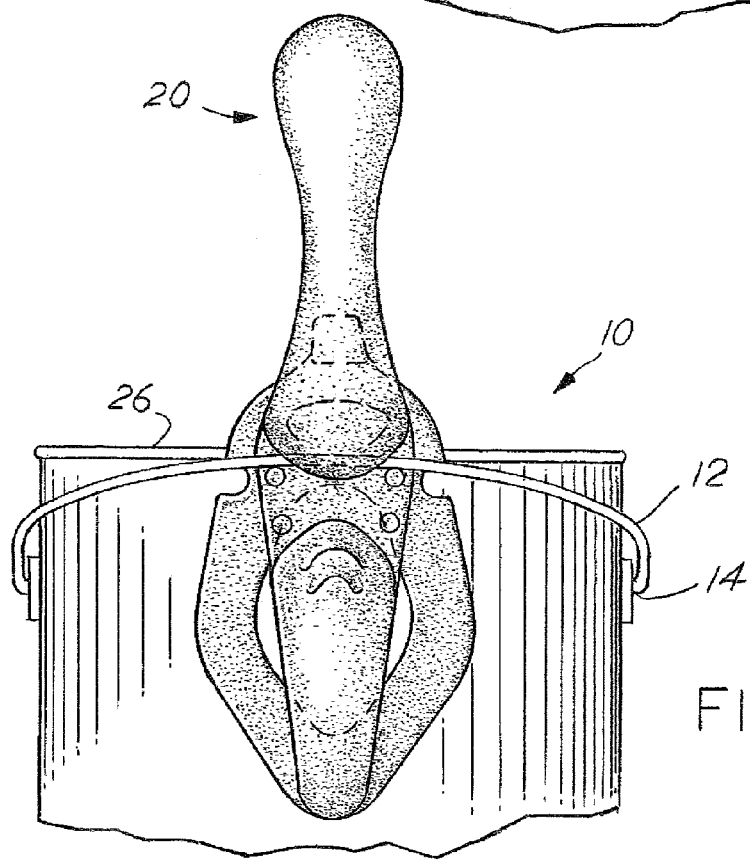
FIG. 7 is a front view of the holding device as it is installed.

The holding device 20 is installed on the can 10 by placing it between the bail and the can. The user selects one of the possible orientations of the holding device 20 and places the corresponding facing surface above the can opening and towards the can below. The bail is placed in the first notch 22 and first can facing surface 24 and is held near or on the top of the can 26. Then the holding device 20 is pivoted and slid about the top edge 26 of the container 16 until the first can facing surface 24 is between the bail 12 and the outside surface 18 of the container. An alternate installation involves using an alternate second can facing surface 42 and third can facing surface 46 and their respective second notch 44 and third notch 48. By using an alternate surface, it is possible to locate the handle portion 30 in different orientations to the can 10 as is shown in FIGS. 7 and 8. When two generally opposite surfaces are disposed for attachment, a handle then becomes reversible for use with either the left or the right hand, and the handle portion 30 can be designed for maximum comfort and ergonomic gripping angles. In the preferred embodiment, there are three can facing surfaces; first can facing surface 24, second can facing surface 42, and third can facing surface 46 that can attach to a can 16. When the can 10 is held and suspended by the holding device 20 as is shown in FIGS. 2, 3, 7, and 8, the bail is held in tension, maintaining contact between the can facing surface and the outside surface 18 of the can.

When the user sits the device 20, as attached to the can, down and it is no longer held by the holding device 20, the tension in the bail 12 is released slightly. The holding device 20 then may be allowed to slide down the can 16 as is shown in FIG. 2. For the purposes of simplicity, the can 10 is shown as the movable object in FIG. 2. When the device 20 is used in the down position 50 as is shown in FIG. 2, the hole 40, located adjacent to the body 32, would allow the user to support the can on the bottom with one portion of their hand and stabilize it by putting another portion of their hand through the hole 40. In the preferred embodiment, the body 32 has a hole 40 for insertion of a thumb such that the lower loop created by the hole 40 fits comfortably within the thumb web adjacent to the thumb. A painter may then place one or more fingers under the container 16 for support. A painter may also choose not to support the bottom of the can 16 with fingers and instead place a palm and fingers on the lower side surface of can 16. By utilizing the thumb web, the thumb is not strained thereby providing comfort and avoiding possible injury. In the released position 50, the shape of the sides of the notch still allows the first can facing surface 24 to pivot relative to the can 10. This pivoting allows the painter a better ergonomic grip in all applications. The device's sliding action up and down within the allowed range of motion as shown in FIG. 2 combines with the flexibility of bail 12 and the notch resilience to create a springy, shock absorbing quality. This springy nature increases user comfort.

Other can designs such as the can 8 shown in FIG. 1 have an external lip or ledge 102 comprised of a surface that extends out from and is attached to the outside surface 18. In FIG. 1, the outside surface 18 is shown angled forward approximately twenty degrees from vertical to shift the center of gravity to thereby provide better balance to the device and can assembly. The can opening is angled downward away from the handle to provide a larger opening for accessing the contents. The ledge 102 is usually near or at the top of the can. The ledge 102 can have a depth forming a cavity between the inside diameter of the ledge and the outside surface 18. The depth of the cavity can vary based on can design and shape. The holding device has a stop 100 that abuts or fits inside the cavity created by the overhanging ledge 102 on the can as is shown in FIG. 1. Injection molded buckets 8 as shown in FIG. 1 have the ledge 102 at the top and the bail pivot points 14 located in the external face of the ledge cavity. This alignment of the pivots with the top of the container results in a very different set of forces than those created by the bail geometry of a standard gallon can 10. As noted, a standard gallon can 10 with pivot points 14 set about two inches below the top surface 26 creates a maximum bail tension point when the bail is adjacent to the container and slightly above the opening plane. In contrast, when pivots are aligned with a ledge 102, there is no tension point above the ledge to maintain contact between the first can facing surface 24 and the outside surface 18. The stop 100 has a top surface 120 and can also have a wall 122 and a depression 124 as shown in FIG. 6. The top surface 120 is adjacent to the first can facing surface 24 and the wall 122 is adjacent to the top surface 120. The wall 122 is substantially parallel to or sloping away from the first can facing surface 24. Where the wall 122 meets the body 32 there is a depression 124. The wall 122 or top surface 120 is designed to mate with or abut an external ledge 102 that extends out from the outside surface 8 of the can. When the device 20 is used with a can with an external ledge 102, the top surface 120, or the depression 124 supports the weight of the can 10 and the wall 122 maintains contact between the uppermost portion of the first can facing surface 24 and the outside surface 18 of the can. For a can that has a cavity too deep for the top surface to provide support, the depression 124 supports the can. The bail 12 installed in the first notch 22 stabilizes the can. In this installation, the bail 12 is held below the top surface of the can 8. The shape of the top surface 120 and depression 124 is such that the first can facing surface 24 can be rotated relative to the axis of the can 8. One purpose of the top surface 122 is to serve as a support for the can 8 in conjunction with the first notch 22 keeping the bail 12 in tension to maintain contact between the outside surface 18 and the first can facing surface 24 when the user holds the can at an angle for pouring or tilting. The profile of the depression 124 can follow the shape of the top surface 120 to allow pivoting of the first can facing surface 24 relative to the outside surface 18. In order to remove the device from a lipped container, one must simply separate the device from its connection to the container lip and then much of the tension on the bail is released. Top stop 100 has a top surface 120 and may further have additional intersecting top surfaces 119, 121 extending away from top surface 120 in a downward angle. Similar to depression 124, top surface 120 may be contoured down and away from its central top surface 120, or it may be faceted downward with intersecting top surfaces 119 and 121.

The body 32 or first notch 22 can be formed from a flexible material. A flexible notch or body allows the first can facing surface 24 and first notch 22 to move closer together while the user installs the device on traditional paint can 10 or a lipped can 8. The flexibility of the body 32 or first notch 22 prevents excessive tension in the bail 12 during installation or removal. In the preferred embodiment, the can facing surface 24 between top stop 100 and distal can facing surface 440 is structured as a thin form to provide more resilience than the rest of the body 32 or handle 30. Primarily the resilient portions of the can facing surface are the angled can facing extensions 410 and 420. Excessive tension in the bail 12 could damage the bail, rendering it useless or causing unexpected failure during use. Excessive bail tension can occur when a lipped can 8 has a large ledge 102. Standard gallon paint containers have bail pivot points that are set almost two inches below the top of the can, and this offset bail geometry creates excessive bail tension when the bail is near a ledge 102 and slightly above the container. By flexing during installation, the device 20 not only reduces the chances of damaging the bail 12, but it also retains better contact between the first can facing surface 24 and the outside surface 18 when the device 20 is installed.

The bail retention feature can also be made from several grooves instead of a notch, the user places the bail in one of the grooves or between the protrusions 82 based on the desired handle orientation. As with the first notch 22, second notch 44, and third notch 48, the grooves are a specific distance from the opposing can facing surface such that the bail is held in tension, and the holding device is restrained between the bail on one side and the outside surface of the container 18. The protrusions 82 or grooves prevent the axis of the can from rotating relative to the first can facing surface 24.

Other features on the holding device can include additional handle features. As shown in FIG. 6, these features include but are not limited to, holes, a can opener, a notch 110, slots 112, 114, and protruding arms. Optionally, a magnet 90 can be attached to the handle of the device to hold a paint brush by the ferrule. The device can be installed on the can 10 in positions that allow the user to have free and clear access to the opening of the can at certain installed positions. In other positions, a portion of the handle may minimally extend over the can opening to adjust to the center of gravity of the combined device and can assembly or to optimize use of the magnet.

Figure 13:
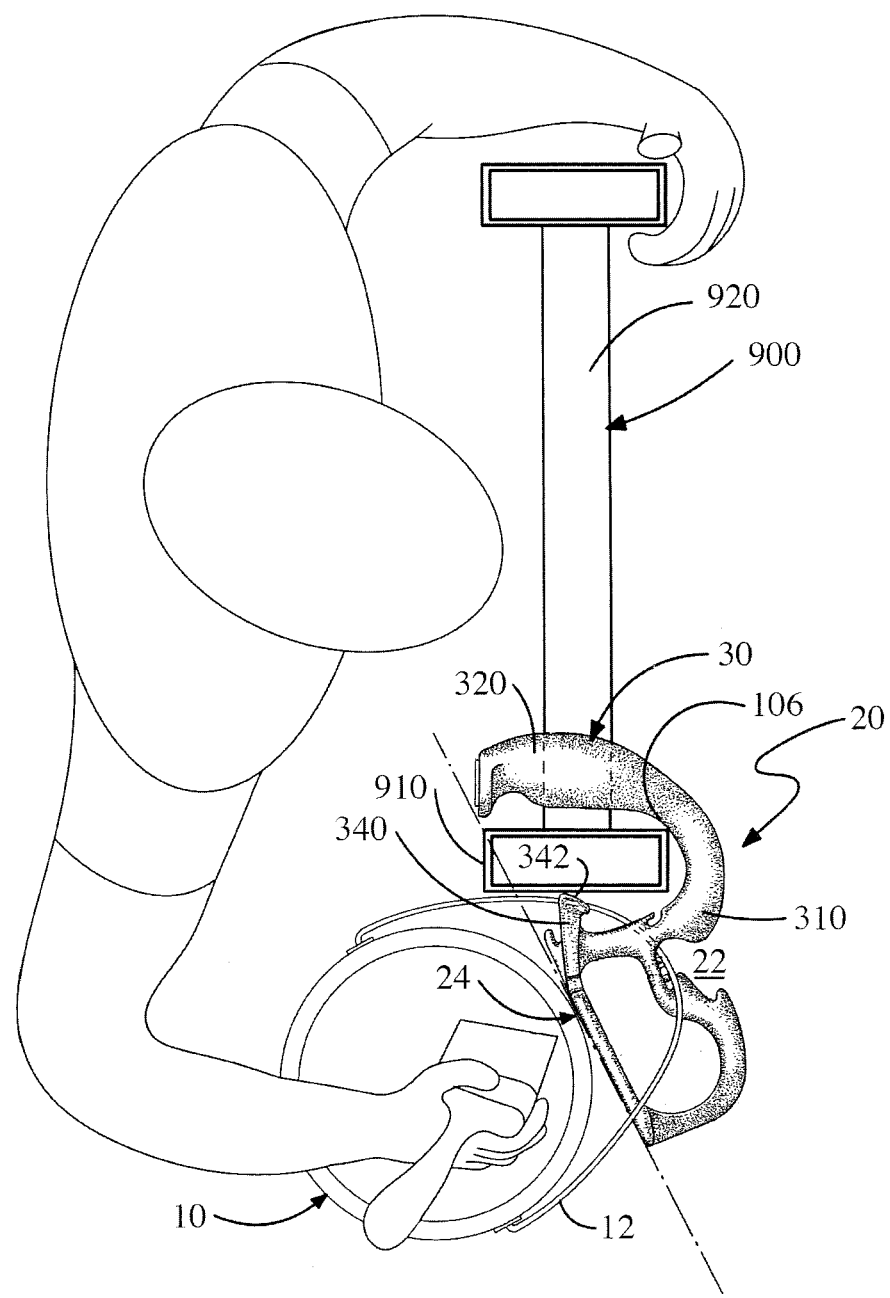
FIG. 13 is another top view of the holding device suspending a can from a ladder.

As shown specifically in FIGS. 11-13, the device 20 can be used to suspend a can 10 from a conventional ladder 900. The configuration of body 32 and curved handle 30 allows the device to be "hooked" around the ladder legs 910 above one of the ladder rungs 920. As shown, curved "hook-shaped" handle 30 extends integrally from body 32 opposite of a secondary arched handle structure 400 formed as part of body 32. Arched handle structure 400 extends down and away from notch 22 and then it curves forward to connect to distal can facing surface 440 which applies pressure against an outside surface 18 of a container 16 when device 20 is in its central vertical position. Body 32 extends forward above notch 22 to connect to can facing surface 24 at proximal can facing surface 450. Can facing surface 450 includes the can facing surface side of top stop 100. Adjacent to proximal can facing surface 450, angled can facing extensions 410 and 420 extend down and away from the vertical axis of device 20. Can facing extensions 410 and 420 curve inward to connect to distal can facing surface 440. Angled can facing extensions 410 and 420 are substantially coplanar with can facing surface 24. In FIG. 12, angled can facing extension 410 provides important can facing support below bail 12 and pivoted notch 22 during pivoted handle use.

Handle 30 has an integral neck 310 that emerges from body 32 above notch 22 extending away form can facing surface 24 of body 32 and a distal handle part 320 that bends back over body head 340 to terminate close to the plane of the can facing surface 24. The grip part 320 is spaced from and over handle neck 310 to form an open area 301. Grip part 320 is shaped to be easily grasped by the hand when device 20 is used to hand support can 10, but also to function as a "hook" for suspending the can from ladder 900. Grip part 320 has a surface area facing handle neck 310 that extends from its distal end until merging into handle neck 310, which provides the extended catch surface 106 that contacts ladder leg 910 and ladder rung 920 when suspending can 10 from ladder 900. Device body 32 also has a head part 340 integrally formed between stop 120 and handle neck 310. Head part 340 extends into opening 301 between handle neck and grip part 320. Head part 340 has a catch surface 342 that contacts ladder leg 910 when suspending can 10 from the ladder.

In use as a can hanger (FIGS. 11-13), the can 10 is held securely by the device 20 which is oriented so that can facing surface 24 lies flat across can surface 18, the bail 12 seated within notch 22 and the plane of handle 30 is angled slightly with respect to the plane of the can opening. Handle 30 hooks around ladder leg 910 atop of ladder rung 920 to suspend can 10 from ladder 900. Device 20 is pivoted in relation to the can and then hooked around ladder leg 910 from the rear or underside. As shown, the device 20 is oriented so that can facing surface 24 contacts can 10 tangentially and bail 12 is captured in notch 22. In this orientation, device 20 acts as a moment arm that allows the device to suspend can 10 from ladder 900. Device 20 pivots under the force of gravity so that ladder leg 910 is juxtaposed under tension between handle portion 30 and body 32 of device 20. Catch surface 106 of grip part 320 abuts against the inside ladder leg 910 and contact surface 342 of head part 340 abuts against the outside of ladder leg 910. Once device 20 comes to rest on a ladder rung 920, handle 30 is compressed against the interior of the side rail by gravity acting on the container. On a standard gallon can 10, a secure attachment to the ladder occurs when the container 16 is adjacent to the ladder and disposed at a slight angle toward the painter. This provides a painter with a better view of the contents of the can 10. Since the device pivots both left and right, it can be attached on either side of the ladder at the painter's discretion.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

I claim:

1. A device for suspending a can from a ladder where the can has a pivoting bail capable of pivoting so that the bail may be moved to a position adjacent to the can, and the ladder has an elongated ladder leg and a rung extending from the ladder leg, the device comprising:
    a body; and
    an integral curved handle extending from the body,
    the handle having a neck part extending outward from the body and integral grip part that bends back over the neck part so that the grip part is spaced from the neck part and the body to form an opening therebetween for receiving the ladder leg and rung, the grip part having a first catch surface facing the neck part and adapted to abut one of the ladder leg and ladder rung when the device is suspending a can from the ladder,
    the body having a first can facing surface adapted for bracing against a can and a bail receiving notch adapted for receiving said bail, the bail receiving notch located substantially opposite said first can facing surface and spaced therefrom,
    the body having a head part extending therefrom adjacent the neck part toward the grip part, the head part having a second catch surface facing the grip part and adapted to abut against the ladder leg opposite the grip part when the device is suspending a can from the ladder.

2. The device according to claim 1, the head part extending from the body toward the grip part.

3. The device according to claim 1, the second catch surface spaced from the grip part.

4. The device according to claim 1, the grip part having a distal end terminated adjacent to the plane of the can facing surface.

5. The device according to claim 1, the bail receiving notch adapted such that a central axis of the can is rotatable from a central axis of said body.

6. The device according to claim 1, the bail receiving notch having a plurality of protrusions, such that the bail is selectively interposed between the plurality of protrusions when the bail is received in the bail receiving notch to selectively orient and support the can relative to the body.

7. The device according to claim 1, the first and second catch surfaces angle upward and away from the bail receiving notch.

8. A device for holding a can having a pivoting bail capable of pivoting so that the bail may be moved to a position adjacent to the can, the device comprising:
    a body; and
    a curved handle extending from the body,
    the body having a top end and a bottom end, the body also having a can facing surface adapted for bracing against a can, the can facing surface defined by points contacting said can when the body is in contact with said can, the can facing surface of the body is wider in the middle than it is at the top or bottom,
    the handle having a first handle end integrally connected to the body top end and a second handle end integrally connected to the body bottom end, the handle also having a bail receiving notch located between the first handle end and the second handle end and adapted for receiving said bail, the bail receiving notch on the body located substantially opposite the can facing surface and spaced therefrom by a first predetermined distance.

9. The device according to claim 8, the body is a substantially oval shape.

10. The device according to claim 8, the bail receiving notch having a plurality of protrusions, such that the bail is selectively interposed between the plurality of protrusions when the bail is received in the bail receiving notch to selectively orient and support the can relative to the body.

11. The device according to claim 8, the body has opposed side edges adjacent the can facing surface that are also adapted to abut the can.

12. The device according to claim 11, the side edges having a side notch adapted for receiving the bail.

13. The device according to claim 8, the at least one of the body and the handle is resilient wherein it may temporarily deform during installation of the device onto a container thereby preventing unwanted bail deformation.

14. The device according to claim 8, further a second handle projecting upward from the body.

15. The device according to claim 8, further an upper handle having a neck part extending outward from the body and integral grip part that bends back over the neck part so that the grip part is spaced from the neck part and the body to form an opening therebetween for receiving a ladder leg and a rung of a ladder, the grip part having a first catch surface facing the neck part and adapted to abut one of the ladder leg and the ladder rung when the device is suspending a can from the ladder, the body having a head part extending therefrom adjacent the neck part toward the grip part, the head part having a second catch surface facing the grip part and adapted to abut against the ladder leg opposite the grip part when the device is suspending a can from the ladder.

16. A device for holding a can having a pivoting bail capable of pivoting so that the bail may be moved to a position adjacent to the can, the device comprising:

a body, the body having a top end and a bottom end, the body also having a can facing surface adapted for bracing against a can, the can facing surface defined by points contacting said can when the body is in contact with said can;

a first handle extending from the body, the first handle having a first handle end integrally connected to the body top end and a second handle end integrally connected to the body bottom end, the handle also having a bail receiving notch located between the first handle end and the second handle end and adapted for receiving said bail, the bail receiving notch on the body located substantially opposite the can facing surface and spaced therefrom by a first predetermined distance; and a second handle projecting upward from the body.

17. The device according to claim 16, wherein the second handle has a neck part extending outward from the body and integral grip part that bends back over the neck part so that the grip part is spaced from the neck part and the body to form an opening therebetween for receiving a ladder leg and a rung of a ladder, the grip part having a first catch surface facing the neck part and adapted to abut one of the ladder leg and the ladder rung when the device is suspending a can from the ladder.

18. The device according to claim 17, where the body having a head part extending therefrom adjacent the neck part toward the grip part, the head part having a second catch surface facing the grip part and adapted to abut against the ladder leg opposite the grip part when the device is suspending a can from the ladder.

* * * * *